(12) United States Patent
Kubo et al.

(10) Patent No.: US 11,473,904 B2
(45) Date of Patent: Oct. 18, 2022

(54) MEASUREMENT PROBE

(71) Applicant: Panasonic Intellectual Property Management Co., Ltd., Osaka (JP)

(72) Inventors: Keishi Kubo, Osaka (JP); Takashi Inoue, Osaka (JP); Masateru Doi, Osaka (JP); Makoto Okazaki, Osaka (JP); Yukiya Usui, Gifu (JP); Takanori Funabashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 180 days.

(21) Appl. No.: 17/077,515

(22) Filed: Oct. 22, 2020

(65) Prior Publication Data

US 2021/0123725 A1    Apr. 29, 2021

(30) Foreign Application Priority Data

Oct. 28, 2019  (JP) .............................. JP2019-195529

(51) Int. Cl.
*G01B 11/26*  (2006.01)
*G01B 11/00*  (2006.01)

(52) U.S. Cl.
CPC ............ *G01B 11/26* (2013.01); *G01B 11/005* (2013.01)

(58) Field of Classification Search
CPC .... G01N 11/26; G01B 11/005; G01B 11/026; G01B 11/245; G01B 11/002; G01B 11/24; G01B 3/008; G01B 5/012
See application file for complete search history.

(56) References Cited

U.S. PATENT DOCUMENTS 5,455,677 A    10/1995 Yoshizumi et al.
7,367,132 B2    5/2008 Mitsuhashi

FOREIGN PATENT DOCUMENTS

JP    61-200419    9/1986
JP    4-052642 Y    12/1992

(Continued)

*Primary Examiner* — Rebecca C Bryant
(74) *Attorney, Agent, or Firm* — Wenderoth, Lind & Ponack, L.L.P.

(57) ABSTRACT

A measurement probe of the present disclosure that scans a surface of a measurement object to measure a three-dimensional shape or the like of the surface of the measurement object includes a first movable portion having a stylus, a second movable portion that is connected to the first movable portion to be movable in a Z direction, a third movable portion that is connected to the second movable portion to be movable in the Z direction, a first position measurer that measures a first position of the first movable portion in the Z direction, a second position measurer that measures a second position of the second movable portion in the Z direction, and a third position measurer that measures a third position of the third movable portion in the Z direction. A first relative position is calculated based on the first position and the second position. A second relative position is calculated based on the first position and the third position. The first relative position of the second movable portion with respect to the first movable portion in the Z direction and the second relative position of the third movable portion with respect to the first movable portion in the Z direction are maintained constant.

7 Claims, 13 Drawing Sheets

(56) References Cited

FOREIGN PATENT DOCUMENTS

| | | |
|---|---|---|
| JP | 3000819 B | 1/2000 |
| JP | 2006-266903 | 10/2006 |
| JP | 2012-078344 | 4/2012 |
| JP | 2012078344 A * | 4/2012 ......... F02M 25/0809 |

* cited by examiner

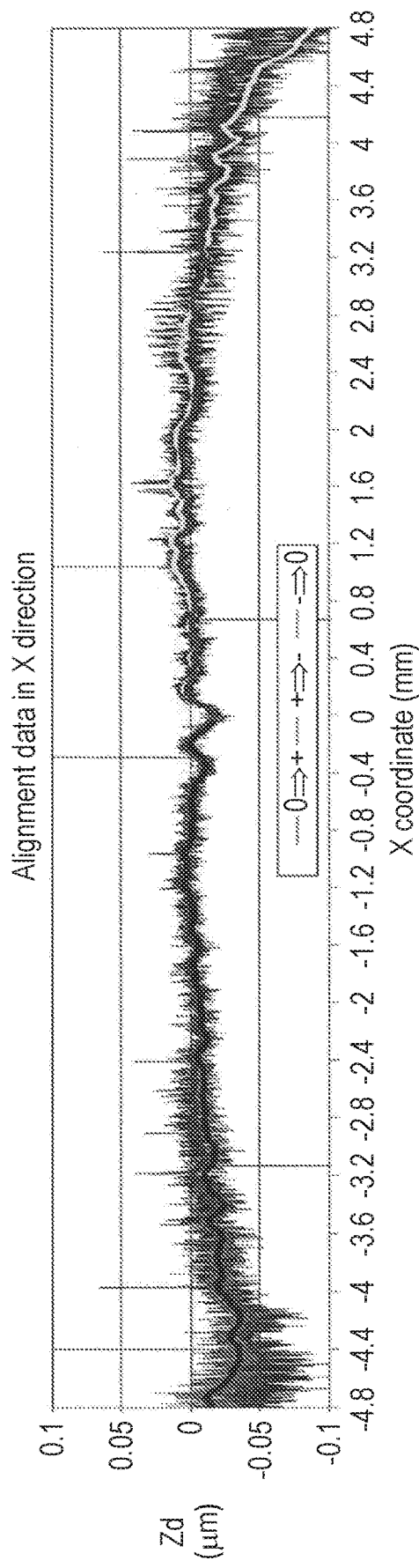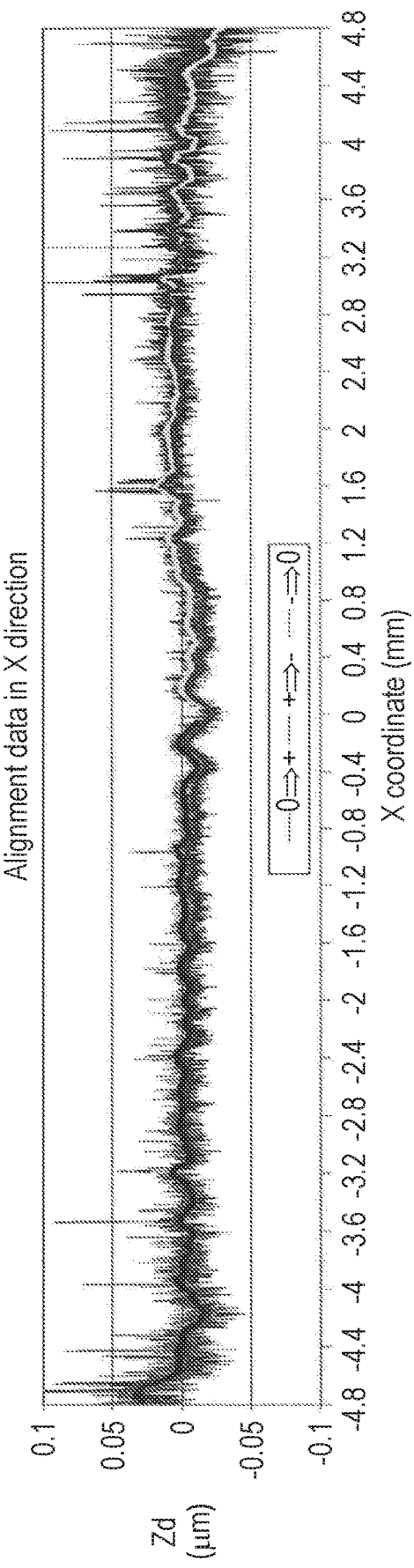

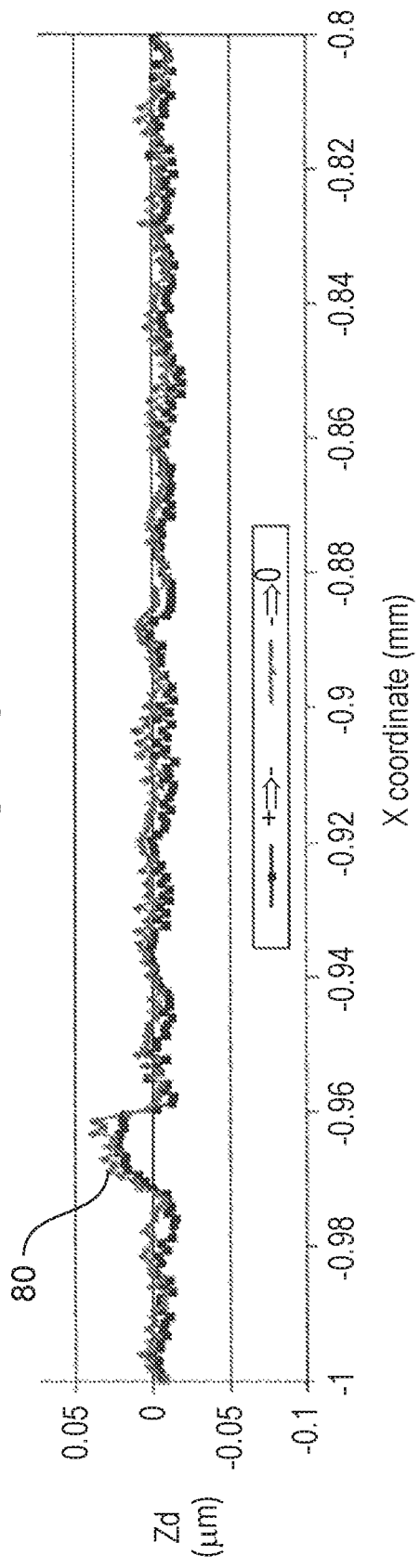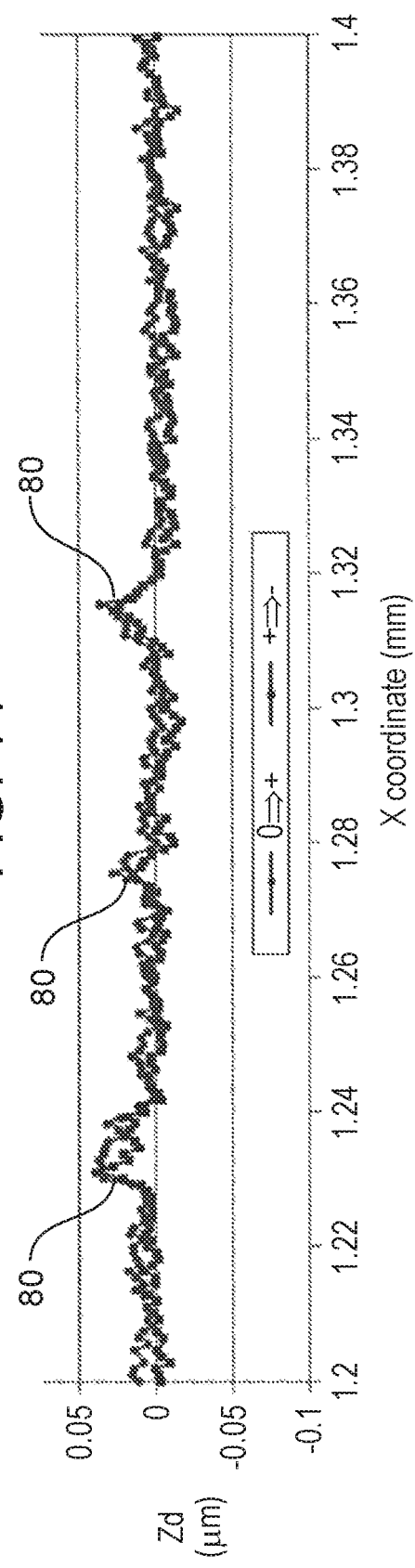

MEASUREMENT PROBE

BACKGROUND

1. Technical Field

The present disclosure relates to a measurement probe of a shape measuring device that scans and measures a measurement object.

2. Description of the Related Art

With the progress of an optoelectronic technique in recent years, high definition of digital broadcasting from 4K to 8K progresses. As a result, there is a demand for improved image quality in a digital camera and the like, or in a camera used in a mobile device such as a smartphone. A surface shape of a lens used in the cameras and the like is required to have an error of, for example, 0.03 μm (30 nm) or less with respect to a design shape, and demand for a high-precision lens increases.

There is an increasing need for highly accurate measurement of a shape measuring device that measures the surface shape of the lens with high accuracy. Therefore, a measurement method using a probe described in Japanese Patent No. 3000819 is proposed.

A method of obtaining a measurement position by adding and subtracting signal data of two measurers is also proposed as in Japanese Unexamined Patent Application Publication No. 61-200419.

SUMMARY

A measurement probe according to one aspect of the present disclosure that scans a surface of a measurement object to measure a shape of the surface of the measurement object includes a first movable portion having a stylus, a second movable portion that is connected to the first movable portion and is movable in a Z direction, a third movable portion that is internally provided with a space for accommodating the second movable portion, is connected to the second movable portion, and is movable in the Z direction, a first position measurer that measures a first position of the first movable portion in the Z direction, a second position measurer that measures a second position of the second movable portion in the Z direction, and a third position measurer that measures a third position of the third movable portion in the Z direction.

A first relative position is calculated based on the first position and the second position.

A second relative position is calculated based on the first position and the third position.

The first relative position of the second movable portion with respect to the first movable portion in the Z direction and the second relative position of the third movable portion with respect to the first movable portion in the Z direction are maintained constant.

BRIEF DESCRIPTION OF THE DRAWINGS

FIG. 7 is a graph showing a measurement result with measurement force of 15 mgf.

FIG. 8 is a graph showing a measurement result with a measurement force of 1.7 mgf.

FIG. 13 is a graph in which region P3 of the graph in FIG. 12 is enlarged.

FIG. 14 is a graph in which region P4 of the graph in FIG. 12 is enlarged.

DETAILED DESCRIPTION

Measurement probes described in Japanese Patent No. 3000819 and Japanese Unexamined Patent Application Publication No. 61-200419 still have room for improvement in terms of reduction of measurement force of the probe and a high-speed response of the probe. The measurement force is force applied to an object to be measured by the measurement probe during measurement.

Background of Present Disclosure

There is an increasing need for highly accurate measurement in a shape measuring device that performs the highly accurate measurement, and a measurement method using a probe is proposed as in Japanese Patent No. 3000819. In Japanese Patent No. 3000819, a movable portion is configured of a lightweight air slider weighing 0.2 g and is supported by a micro spring, and thus a pressure on the measurement object can be suppressed to 30 mgf or less. A method of obtaining a measurement position by adding and subtracting signal data of two measurers is also proposed as in Japanese Unexamined Patent Application Publication No. 61-200419.

To reduce a thickness of a lens and improve optical characteristics of the lens, a plastic lens using a plastic material having a soft surface is required to have the reduced measurement force of the probe and the high-speed response of the probe.

Figure 15:
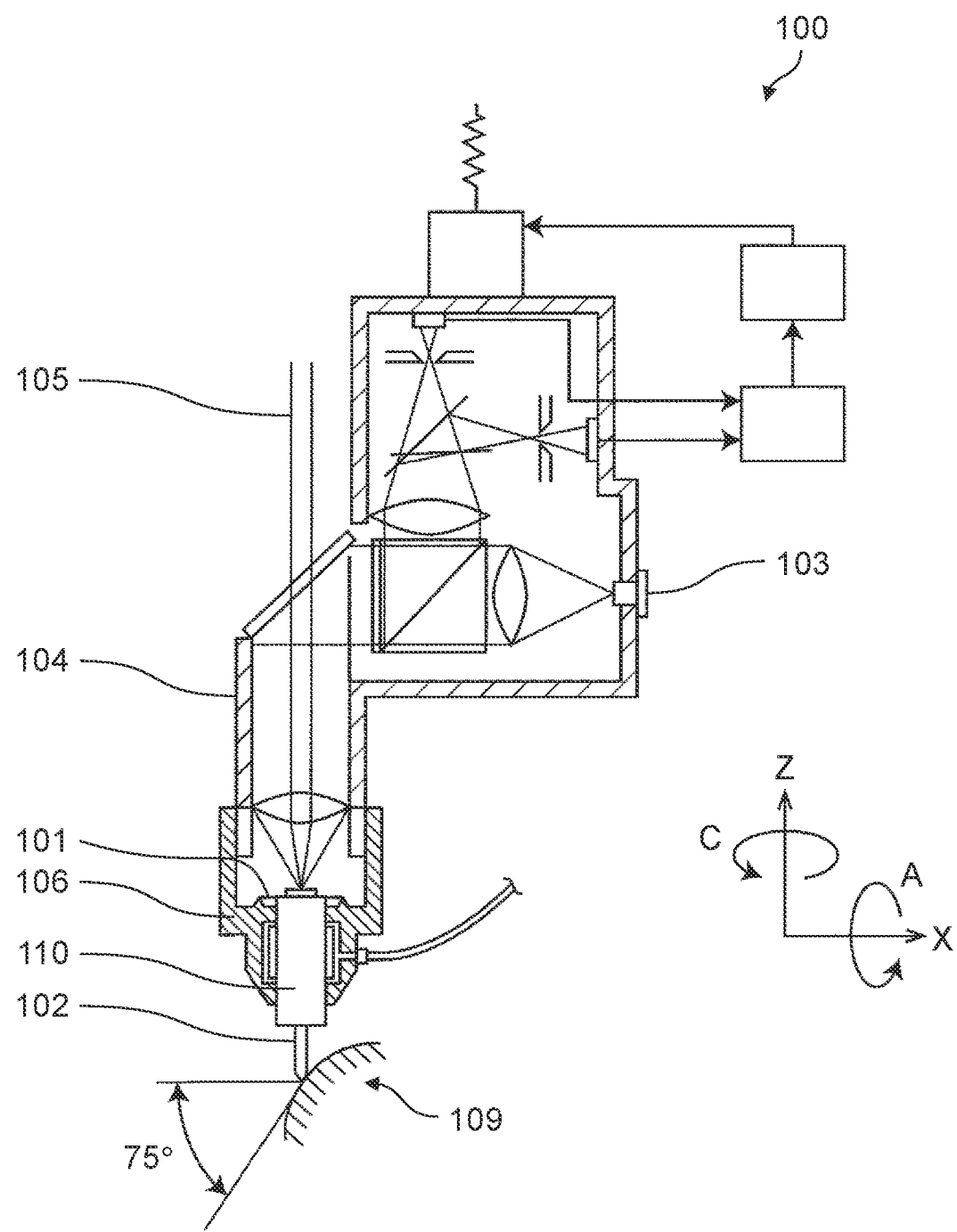
FIG. 15 is a diagram showing a measurement probe described in Japanese Patent No. 3000819.

FIG. 15 is a diagram showing a measurement probe described in Japanese Patent No. 3000819. As shown in FIG. 15, measurement probe 100 described in Japanese Patent No. 3000819 is configured of micro spring 101, stylus 102, focus detection amount laser 103, probe unit 104, frequency-stabilized He—Ne laser 105, Z-axis stage 106, and micro air slider 110. Weight of stylus 102 and micro air slider 110 is supported by micro spring 101. Measurement probe 100 measures a displacement amount of micro spring 101 as a strain amount of micro spring 101 during scanning in an XY direction by a semiconductor laser optical system. Shape measurement is performed by the scanning in the XY direction in a state where the displacement amount is fed back to measure a shape of a measurement surface of measurement object 109 by constant measurement force. As described above, the shape measurement is performed by the scanning in the XY direction in a state where the strain amount of micro spring 101 is constantly fed back. Therefore, it is possible to maintain constant measurement force.

As shown in FIG. 15, an inclined measurement surface may be measured in the measurement of measurement object 109. For example, a lens surface of a camera such as a smartphone has a measurement surface inclined by about 75°. Even in such a case, it is required to detect the measurement force of measurement probe 100 and maintain a deformation amount (deflection amount) of micro spring 101 constant. When measurement probe 100 is scanned in the XY direction on the inclined measurement surface, it is required to move Z-axis stage 106 in a Z direction due to the inclination of the measurement surface. As shown in FIG. 15, when the measurement surface is inclined around a Y-axis by 75°, in order to maintain the measurement force constant, it is required to move Z-axis stage 106 at a speed of tan 75° (≈3.73) times a movement speed in an X direction, in the Z direction.

Since weight of Z-axis stage 106 is, for example, about 2 kg, a movement speed in the Z direction may be limited. Therefore, a problem occurs in which Z-axis stage cannot be moved at a desired speed with respect to an inclined side surface. There is a problem that it is difficult to perform the scanning and the measurement in the XY direction while maintaining the measurement force at a constant low value to follow a change in minute unevenness on the measurement surface of measurement object 109.

There is a problem that the feedback with the low measurement force cannot be performed by the weight of Z-axis stage 106 of about 2 kg. Further, there is a problem that the strain amount of micro spring 101 cannot be set low due to the influence of an air fluctuation of a laser and thus it is difficult to perform the measurement with the low measurement force.

Figure 16:
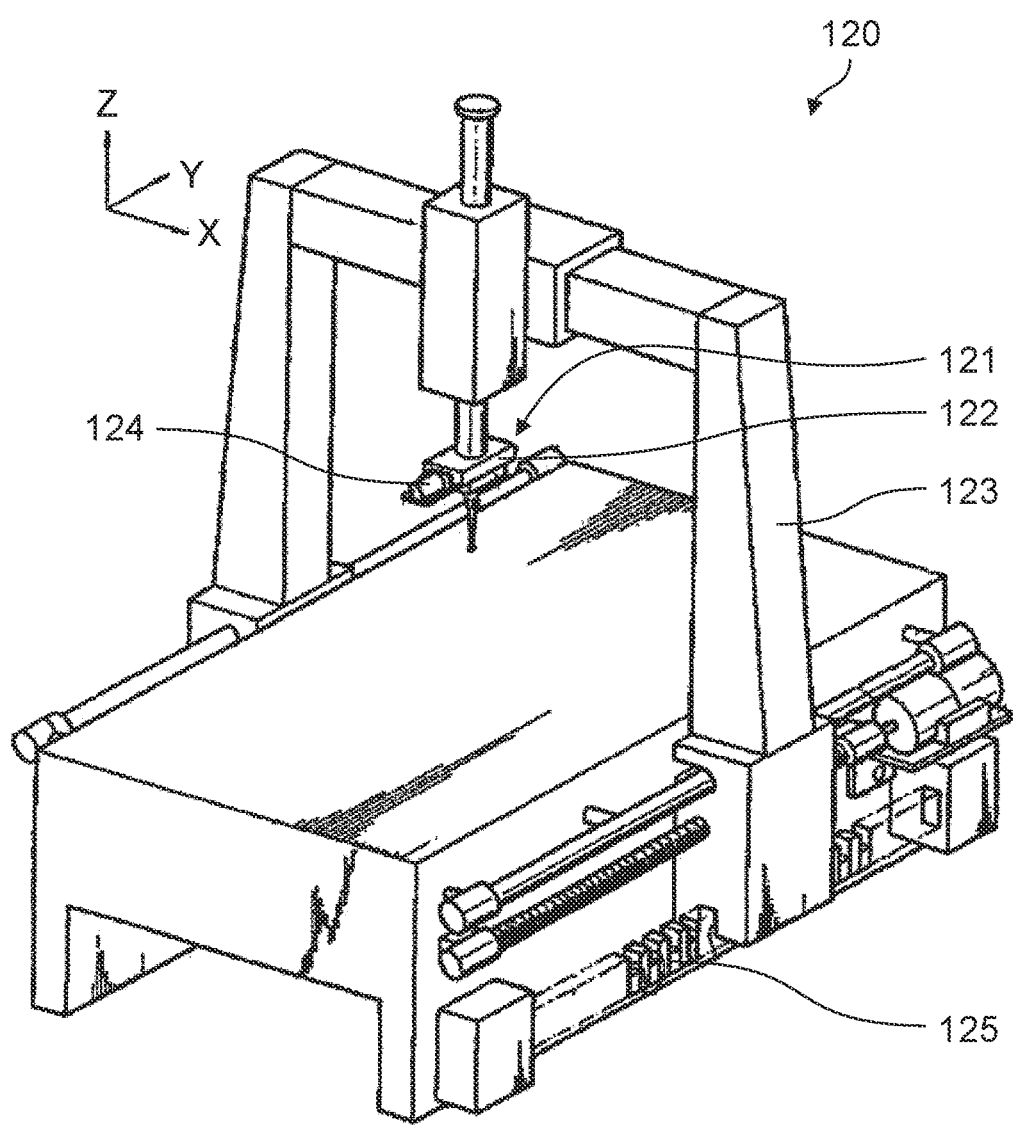
FIG. 16 is a diagram showing a measurement machine described in Japanese Unexamined Patent Application Publication No. 61-200419.

FIG. 16 is a diagram showing a measurement machine described in Japanese Unexamined Patent Application Publication No. 61-200419. As shown in FIG. 16, measurement machine 120 described in Japanese Unexamined Patent Application Publication No. 61-200419 includes measurement probe 121, probe supporting member 122, movement mechanism 123, first measurer 124, and second measurer 125. First measurer 124 measures a movement amount by movement mechanism 123, and second measurer 125 measures a displacement amount of the probe with respect to probe supporting member 122 and has a higher resolution than first measurer 124. In an arithmetic processing device (not shown), output signal data of first measurer 124 and second measurer 125 is added and subtracted, a relative movement displacement amount between measurement probe 121 and a measurement point of the measurement object or coordinates of a point to be measured are obtained, and thus high-speed measurement is possible.

However, with the method of obtaining the measurement position by adding and subtracting the signal data of the two measurers as in Japanese Unexamined Patent Application Publication No. 61-200419, there is a problem that it is difficult to obtain uniform accuracy over the entire length of a measurement stroke. Since the output signals of first measurer 124 and second measurer 125 are added and subtracted to obtain the position, there is a problem that an error may occur in a measurement result.

Therefore, the present inventors have examined a measurement probe for solving the problems and devised the following configuration.

A measurement probe according to one aspect of the present disclosure that scans a surface of a measurement object to measure a three-dimensional shape or the like of the surface of the measurement object includes a first movable portion having a stylus, a second movable portion that is connected to the first movable portion to be movable in a Z direction, a third movable portion that is internally provided with a space for accommodating the second movable portion and that is connected to the second movable portion to be movable in the Z direction, a first position measurer that measures a first position of the first movable portion in the Z direction, a second position measurer that measures a second position of the second movable portion in the Z direction, and a third position measurer that measures a third position of the third movable portion in the Z direction.

A first relative position is calculated based on the first position and the second position.

A second relative position is calculated based on the first position and the third position.

The first relative position of the second movable portion with respect to the first movable portion in the Z direction and the second relative position of the third movable portion with respect to the first movable portion in the Z direction are maintained constant.

With such a configuration, a reduction of the measurement force of the probe and a high-speed response of the probe are possible.

The measurement probe may further include a first spring that connects the first movable portion and the second movable portion, and a second spring that connects the second movable portion and the third movable portion.

With such a configuration, highly accurate measurement can be performed in the Z direction.

Mass of the second movable portion may be 1/100 or less of mass of the third movable portion.

With such a configuration, it is possible to perform the measurement while maintaining the measurement force of the probe low.

The first position measurer, the second position measurer, and the third position measurer may be provided in a space defined inside the measurement probe.

With such a configuration, it is possible to reduce the influence of a variation due to an air fluctuation. It is easy to assemble the measurement probe, and thus it is possible to manufacture the measurement probe at low cost.

The first position measurer may include a first light source.

The second position measurer may include a second light source.

The third position measurer may include a third light source.

Each of the first light source, the second light source, and the third light source may be disposed such that a beam is emitted in parallel to the Z direction.

With such a configuration, an atmospheric temperature and an atmospheric pressure near the beam from each light source are maintained substantially the same. Therefore, it is possible to reduce the influence of the air fluctuation and control the measurement force with high accuracy and high stability.

The measurement probe may reset the first relative position and the second relative position to predetermined positions stored in advance.

With such a configuration, it is possible to provide the measurement probe with a reduced measurement error.

A shape measuring device according to one aspect of the present disclosure includes the measurement probe of any one of Claims 1 to 6.

With such a configuration, it is possible to provide the shape measuring device that reduces the measurement force and realizes the high-speed response.

Hereinafter, an exemplary embodiment will be described with reference to drawings.

First Exemplary Embodiment

Overall Configuration of Shape Measuring Device

Figure 1:
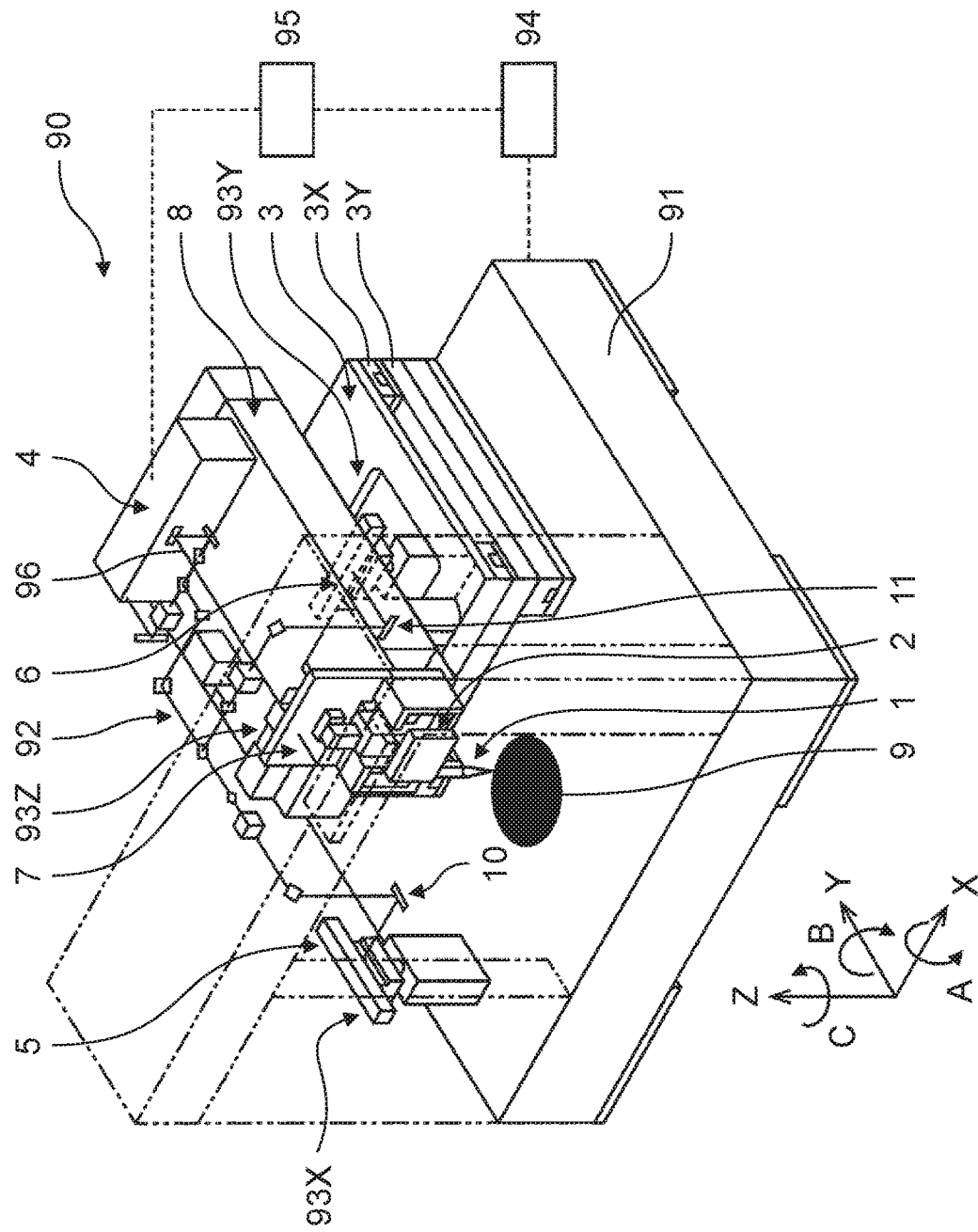
FIG. 1 is an overall configuration diagram of a shape measuring device including a measurement probe according to a first exemplary embodiment of the present disclosure.
Figure 2:
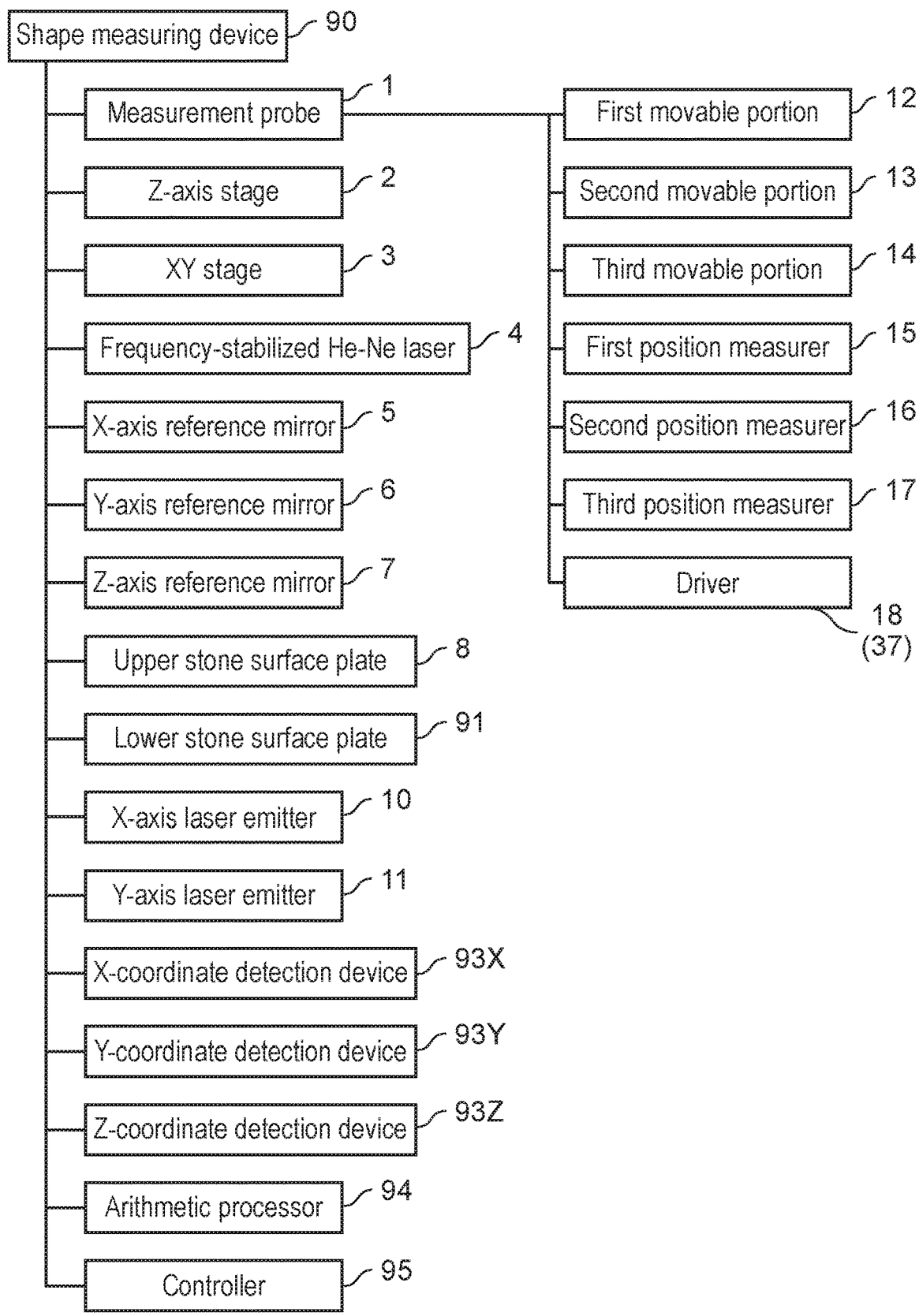
FIG. 2 is a block diagram showing a schematic configuration of the shape measuring device in FIG. 1.

FIG. 1 is an overall configuration diagram of a shape measuring device including a measurement probe according to a first exemplary embodiment of the present disclosure. FIG. 2 is a block diagram showing a schematic configuration of the shape measuring device in FIG. 1. In the present exemplary embodiment, an X direction indicates a width direction, a Y direction indicates a depth direction, and a Z direction indicates a height direction.

As shown in FIGS. 1 and 2, shape measuring device 90 includes measurement probe 1, Z-axis stage 2, XY stage 3, frequency-stabilized Ne—Ne laser 4, X-axis reference mirror 5, Y-axis reference mirror 6, Z-axis reference mirror 7, upper stone surface plate 8 and lower stone surface plate 91, X-axis laser emitter 10, Y-axis laser emitter 11, arithmetic processor 94, and controller 95. Shape measuring device 90 is used to measure a surface shape of measurement object 9.

XY stage 3 is disposed on lower stone surface plate 91 that holds measurement object 9 to be movable in an XY axis direction. Upper stone surface plate 8 is disposed on XY stage 3, and frequency-stabilized He—Ne laser 4 for measuring a position of XYZ coordinates of measurement object 9 is disposed on upper stone surface plate 8.

Measurement probe 1 is attached to upper stone surface plate 8 through Z-axis stage 2. XY stage 3 is configured of motor-driven Y-axis stage 3Y disposed below XY stage 3 and motor-driven X-axis stage 3X disposed above XY stage 3. Frequency-stabilized He—Ne laser beam 96 is emitted by frequency-stabilized He—Ne laser 4, and emitted frequency-stabilized He—Ne laser beam 96 passes through optical system 92 disposed on upper stone surface plate 8, is split into laser beams in three directions of X, Y, and Z axes. Then, the laser beams are respectively reflected by X-axis reference mirror 5, Y-axis reference mirror 6, and Z-axis reference mirror 7 with high flatness of a nanometer order.

With such a configuration, the XYZ coordinates of a surface of measurement object 9 can be measured with ultra-high accuracy of a nanometer order, with X coordinate detection device 93X, Y coordinate detection device 93Y, and Z coordinate detection device 93Z that detects a Z-direction position of measurement probe 1. Arithmetic processor 94 is connected to X coordinate detection device 93X, Y coordinate detection device 93Y, and Z coordinate detection device 93Z. The shape can be measured by arithmetically processing measurement data input from X coordinate detection device 93X, Y coordinate detection device 93Y, and Z coordinate detection device 93Z by arithmetic processor 94 to obtain three-dimensional coordinate data of the surface of measurement object 9. Operations of the units, that is, measurement probe 1, Z-axis stage 2, XY stage 3, frequency-stabilized He—Ne laser 4, X-axis laser emitter 10, Y-axis laser emitter 11, X coordinate detection device 93X, Y coordinate detection device 93Y, Z coordinate detection device 93Z, arithmetic processor 94, and the like are controlled by controller 95, and shape measuring device 90 automatically performs a measurement operation.

Shape measuring device 90 scans measurement probe 1 in the XY direction on the surface of measurement object 9 such as a lens to obtain an XYZ coordinate data string of the surface of measurement object 9. Controller 95 arithmetically processes the string of Z coordinate data at an XY coordinate position of measurement probe 1 to measure the shape of measurement object 9. That is, shape measuring device 90 scans measurement probe 1 in the XY direction to acquire the XYZ coordinates to measure the three-dimensional shape of measurement object 9.

Shape measuring device 90 may be configured to fix measurement probe 1 in the XY direction and move only in the Z direction, and move measurement object 9 in the XY direction to measure the shape of measurement object 9.

Positions of X-axis laser emitter 10 and Y-axis laser emitter 11 with respect to measurement probe 1 are static in shape measuring device 90. Specifically, distances of X-axis laser emitter 10 and Y-axis laser emitter 11 with respect to measurement probe 1 are constant and do not change even when measurement probe 1 moves in the XY direction by XY stage 3. With such a configuration in which the X-axis laser emitter and Y-axis laser emitter 11 with respect to measurement probe 1 maintain the constant distance, a distance from the center of measurement probe 1 to X-axis reference mirror 5 and Y-axis reference mirror 6 can be measured with high accuracy by the laser beams emitted in the X direction and the Y direction.

Overall Configuration of Measurement Probe

Figure 3:
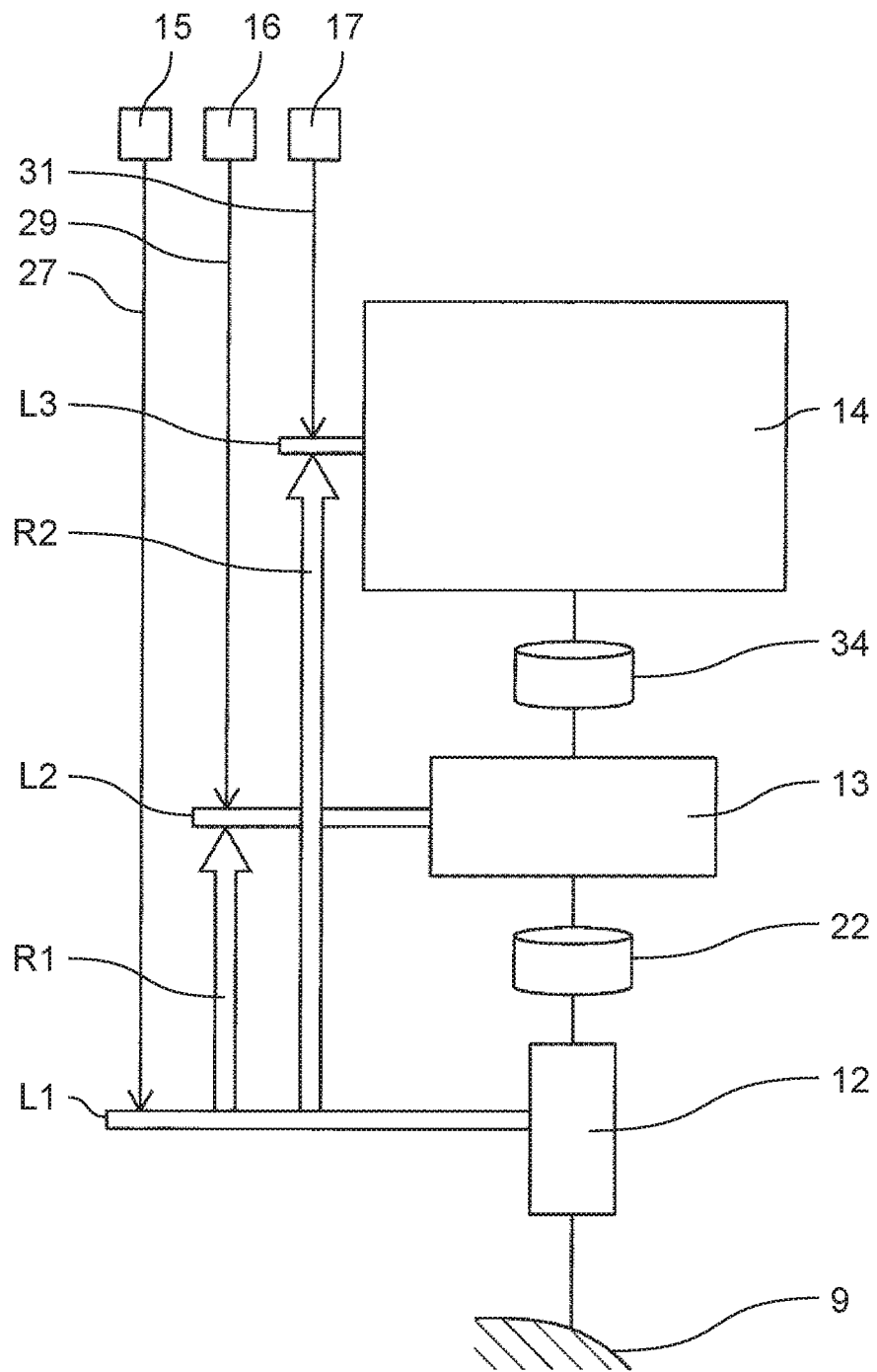
FIG. 3 is a schematic diagram of the measurement probe mounted on the shape measuring device in FIG. 1.
Figure 4:
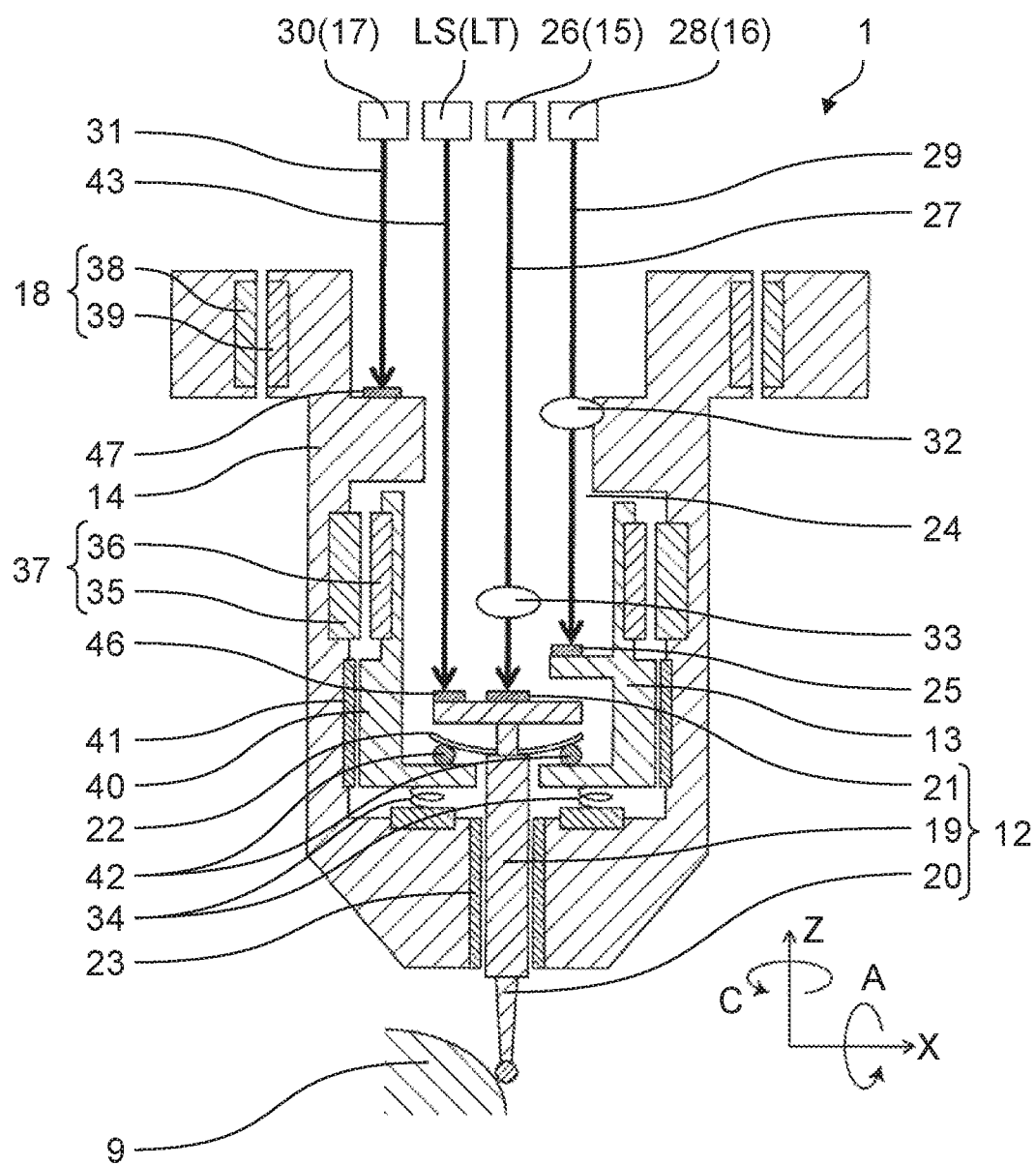
FIG. 4 is a diagram showing a schematic configuration of the measurement probe mounted on the shape measuring device in FIG. 1.

A configuration of measurement probe 1 of the present disclosure is shown with reference to FIGS. 3 and 4. FIG. 3 is a schematic diagram of the measurement probe mounted on the shape measuring device in FIG. 1. FIG. 4 is a diagram showing a schematic configuration of the measurement probe mounted on the shape measuring device in FIG. 1.

As shown in FIGS. 3 and 4, measurement probe 1 includes first movable portion 12, second movable portion 13, third movable portion 14, first position measurer 15, second position measurer 16, third position measurer 17, a first driver (VCM) 37, and second driver (linear motor) 18. First movable portion 12 and second movable portion 13 are connected by first spring 22, and second movable portion 13 and third movable portion 14 are connected by second spring 34. When coordinates of measurement object 9 in the Z direction are measured, first movable portion 12 and lightweight second movable portion 13 move in the Z direction with a small stroke (for example, 50 to 100 μm), and third movable portion 14, which is heavier than second movable portion 13, moves in the Z direction with a large stroke (for example, 40 to 80 mm). Lightweight second movable portion 13 and heavy third movable portion 14 are combined as described above, and thus it is possible to move measurement probe 1 at high speed in the Z direction while maintaining a low measurement force on measurement object 9.

First Movable Portion

As shown in FIG. 4, first movable portion 12 has air slider 19, stylus 20 disposed at one end of air slider 19, and first mirror 21 disposed at the other end of air slider 19. Air slider 19 of first movable portion 12 is inserted into air bearing portion 23 of third movable portion 14 and is movable in the Z direction. Stylus 20, which is a gauging head in measurement probe 1, is movable in the Z direction and is supported by air slider 19 having rigidity in the XY direction. An own weight of a movable portion of air slider 19 is supported by strip-shaped first spring 22. First spring 22 movably connects first movable portion 12 and second movable portion 13. Air slider 19 maintains the rigidity in the XY direction with an air gap of 3 to 15 μm and is inserted into bearing portion 23 of third movable portion 14.

Further, measurement probe 1 is provided with a detection optical system LT that detects a minute inclination in the XY direction. The detection optical system LT has light source LS and reflects laser beam 43 from light source LS on mirror 46. When stylus 20 receives force in the XY direction due to frictional force on the surface of measurement object 9, the detection optical system LT can detect an inclination of stylus 20 around the X direction (inclination in B direction in FIG. 1) and an inclination of stylus 20 around the Y direction (inclination in A direction in FIGS. 1 and 4).

Second Movable Portion

Second movable portion 13 is connected to first movable portion 12 to be movable in the Z direction and is accommodated in space 24 of third movable portion 14, which will be described below. Second movable portion 13 has second mirror 25 and is movably connected with third movable portion 14 by second spring 34 that connects second movable portion 13 and third movable portion 14, in space 24 of third movable portion 14. Second movable portion 13 has hollow cup-shaped cup slider 40, and cup slider 40 is configured to be movable in the Z direction. Cup slider 40 maintains the rigidity in the XY direction with an air gap of 3 to 15 μm and is inserted into air bearing portion 41 of third movable portion 14. That is, an own weight of second movable portion 13 is supported by second spring 34 to be movable in the Z direction. First spring 22 is supported by support balls 42 provided on a bottom of cup slider 40 of second movable portion 13. Therefore, second movable portion 13 supports first movable portion 12 by first spring 22 and support balls 42. The own weight of second movable portion 13 has a lightweight of about 5 g and can move at high speed in the Z direction. As described below, mass of third movable portion 14 may be about 2 kg, and mass of second movable portion 13 may be 1/100 or less of the mass of third movable portion 14. The mass of second movable portion 13 is preferably 1/200 or less of the mass of third movable portion 14. The mass of second movable portion 13 is more preferably 1/400 or less of the mass of third movable portion 14.

Coordinates of first movable portion 12 in the Z direction can be obtained by focusing laser beam 27 from first light source 26 of first position measurer 15 on first mirror 21 by lens 33 provided in third movable portion 14 and measuring the focused beam with an interferometer.

Laser beam 27 from first light source 26 of first position measurer 15 that measures a Z position of air slider 19 and laser beam 43 from the detection optical system LT that detects the inclination of stylus 20 by the scanning in the XY direction pass through a hollow portion of second movable portion 13.

Cylindrical coil 36 is provided on the outer circumference of second movable portion 13, and coil 36 is combined with magnet 35 provided on the inner circumference of third movable portion 14 to form voice coil motor (VCM) 37 that generates thrust with a simple structure. Second movable portion 13 can be driven in the Z direction by VCM 37. VCM 37 moves second movable portion 13 up and down in the Z direction at high speed, but the own weight of second movable portion 13 is supported by second spring 34. Therefore, second movable portion 13 can be driven with low power consumption. Therefore, it is possible to suppress heat generation, which is a problem during precision measurement.

Second movable portion 13 does not fall due to no external force applied by measurement. Therefore, the rigidity with respect to the inclination of second movable portion 13 around the X direction (inclination in B direction in FIG. 1) and the inclination of second movable portion 13 around the Y direction (inclination in A direction in FIGS. 1 and 2) may be low. Mechanical movement accuracy other than in the Z direction is irrelevant. A manufacturing tolerance of the air gap of cup slider 40 is about 20 μm, and the accuracy of an air bearing is low and cost reduction is easy.

Coordinates of second movable portion 13 in the Z direction can be obtained by focusing laser beam 29 from second light source 28 of second position measurer 16 on second mirror 25 by lens 32 provided in third movable portion 14 and measuring the focused beam with the interferometer.

Third Movable Portion

Third movable portion 14 is provided with space 24 for accommodating second movable portion 13 in third movable portion 14 and is connected to second movable portion 13 to be movable in the Z direction. Third movable portion 14 has a bottomed tubular shape with space 24 formed in third movable portion 14. Air bearing portion 23 that holds air slider 19 of first movable portion 12 to be movable in the Z direction is provided at a bottom portion of third movable portion 14. Second spring 34 is disposed on an inner bottom of third movable portion 14, that is, on a side where second movable portion 13 on the bottom is disposed. Second spring 34 supports the own weight of lightweight second movable portion 13 accommodated in space 24 inside third movable portion 14 upward in the Z direction. That is, second movable portion 13 and third movable portion 14 are movably connected by second spring 34. Coordinates of third movable portion 14 in the Z direction can be obtained by focusing laser beam 31 from third light source 30 of third position measurer 17 on third mirror 47 and measuring the focused beam with an interferometer. Third movable portion 14 is driven in the Z direction by linear motor 18. Linear motor 18 is configured of magnet 38 and coil 39. The own weight of third movable portion 14 is about 2 kg, and the straightness is configured to be 10 nm or less by a ceramic stage (not shown).

First Position Measurer

First position measurer 15 measures first position L1 (refer to FIG. 3) of first movable portion 12 in the Z direction. First position measurer 15 has first light source 26 and reflects laser beam 27 from first light source 26 on first mirror 21 to measure first position L1 of first movable portion 12 in the Z direction. That is, first position L1 is a position of first mirror 21 in the Z direction. As shown in FIG. 4, first position measurer 15 emits laser beam 27 from first light source 26 to first mirror 21 through lens 33 fixed to third movable portion 14 to measure the position of mirror 21 in the Z direction and determine first position L1. The information on the measured first position L1 is used as shape measurement data of measurement object 9. First position measurer 15 is provided with the semiconductor laser optical system. The semiconductor laser optical system emits a beam of a semiconductor laser having a wavelength different from a wavelength of frequency-stabilized He—Ne laser 4 to first mirror 21 using a dichroic mirror (not shown) to measure an initial absolute height of first mirror 21.

Second Position Measurer

Second position measurer 16 measures second position L2 of second movable portion 13 in the Z direction. Second position measurer 16 reflects laser beam 29 of second light source 28 on second mirror 25 through lens 32 provided in third movable portion 14 to measure second position L2 of movable portion 13 in the Z direction with the interferometer (not shown). That is, second position L2 is a position of second mirror 25 in the Z direction.

Third Position Measurer

Third position measurer 17 measures third position L3 of third movable portion 14 in the Z direction. Third position measurer 17 reflects laser beam 31 from third light source 30 on third mirror 47 provided in third movable portion 14 to measure third position L3 of third movable portion 14 in the Z direction with the interferometer (not shown). That is, third position L3 is a position of third mirror 47 in the Z direction.

As shown in FIG. 3, first relative position R1 is a relative position of second movable portion 13 in the Z direction with respect to first movable portion 12, and second relative position R2 is a relative position of third movable portion 14 in the Z direction with respect to first movable portion 12. The first relative position and the second relative position are calculated based on first position L1, second position L2, and third position L3. In the present exemplary embodiment, the calculation of first relative position R1 and second relative position R2 is performed by arithmetic processor 94.

Driver

Measurement probe 1 has second driver 18 that drives third movable portion 14 in the Z direction and first driver 37 that drives second movable portion 13 in the Z direction. First driver 37 corresponds to VCM 37 described above, and second driver 18 corresponds to linear motor 18 described above. VCM 37 drives second movable portion 13 in the Z direction, and linear motor 18 drives third movable portion 14 in the Z direction. That is, first driver 37 drives second movable portion 13 in the Z direction, and second driver 18 drives third movable portion 14 in the Z direction.

First driver 37 and second driver 18 are controlled such that first relative position R1 and second relative position R2 are constant. In the present exemplary embodiment, controller 95 controls linear motor 18 and VCM 37 such that first relative position R1 and second relative position R2 are constant.

Control of Measurement Force

The measurement force applied from measurement probe 1 to measurement object 9 is controlled based on the deformation amount of first spring 22 supporting stylus 20 when stylus 20 contacts measurement object 9. To stably realize the low measurement force, it is preferable to control the measurement force based on both force applied to first spring 22 and force applied to second spring 34. To detect the force applied to first spring 22 and second spring 34, the deformation amounts of first spring 22 and second spring 34 are measured with high accuracy of a nanometer order and high stability.

The coordinates (first position L1) of first mirror 21 in the Z direction by first position measurer 15 and the coordinates (second position L2) of second mirror 25 in the Z direction by second position measurer 16 are measured and a difference between the positions (first relative position R1) is calculated to measure the deformation amount of first spring 22. The coordinates (first position L1) of first mirror 21 in the Z direction by first position measurer 15 and the coordinates (third position L3) of third mirror 47 in the Z direction by third position measurer 17 are measured and a difference between the positions (second relative position R2) is calculated to measure the deformation amount of second spring 34. Laser length measurement by first position measurer 15, second position measurer 16, and third position measurer 17 has high linearity and is effective for minute measurement. To specifically calculate the measurement force, a spring constant KA (N/m) of first spring 22 and a spring constant KB (N/m) of second spring 34 may be measured in advance.

To measure the deformation amounts of first spring 22 and second spring 34, first, measurement probe 1 is moved upward, and laser length measurement values of first light source 26, second light source 28, and third light source 30 are simultaneously acquired in a state where stylus 20 is not in contact with the measurement surface of measurement object 9. At this time, vibration or the like may not be applied to measurement probe 1. When stylus 20 is not in contact with the measurement surface of measurement object 9, the laser length measurement value of first light source 26 is Z2Z, the laser length measurement value of second light source 28 is Z4Z, and the laser length measurement value of third light source 30 is Z5Z. When stylus 20 is in contact with measurement object 9, that is, during measurement, the laser length measurement value of first light source 26 is Z2, the laser length measurement value of second light source 28 is Z4, and the laser length measurement value of third light source 30 is Z5. The values are stored in a memory not shown.

Measurement force MF applied to measurement object 9 is represented by an equation of Formula 1.

$$MF = KA \times \{(Z2-Z4)-(Z2Z-Z4Z)\} \quad \text{Formula 1}$$

The deformation amount of first spring 22 is measured with high accuracy and high stability, and thus the measurement force can be accurately calculated. To measure the deformation amount of first spring 22 with high accuracy and high stability, measurement probe 1 may be stable without drift or the like during an operation of the laser length measurement. However, in the laser length measurement, a refractive index may change and an error in a measurement position may occur when an atmospheric temperature and an atmospheric pressure are non-uniform.

In a case where measurement object 9 is a plastic lens having a thickness of 0.2 mm or less, which is used for a camera such as a smartphone, the measurement force may be 2 mgf or less to measure measurement object 9 without deformation. To control the measurement force to be 2 mgf or less, for example, a spring having the spring constant KA of 20 N/m may be employed as first spring 22 and the deformation amount of first spring 22 may be controlled to about 1 μm. Therefore, a position of first spring 22 may be stably measured with accuracy and stability of 0.1 μm or less, which is 1/10 of the deformation amount.

In the case of laser length measurement, the measurement error is −1 ppm/° C. (=−1e$^6$/° C.) at atmospheric temperature, and a temperature change of 1° C. corresponds to the measurement error of 0.04 μm in a member in which a difference in optical path height between laser beam 27 and laser beam 29 is 40 mm. The measurement error is 0.27 ppm/hPa in atmospheric pressure. In an environment where shape measuring device 90 is installed, for example, opening and closing of a room door cause an atmospheric pressure change of 10 to 20 Pa (0.1 to 0.2 hPa). The change corresponds to the measurement error of 0.015 to 0.03 μm in the member in which the difference in optical path height between laser beam 27 and laser beam 29 is 40 mm.

When beam paths of first light source 26, second light source 28, and third light source 30 are close to each other during the laser length measurement, it is possible to avoid a decrease in the measurement accuracy of the position in the Z direction due to the changes in atmospheric temperature and atmospheric pressure. Therefore, first position measurer 15, second position measurer 16, and third position measurer 17 are provided in a space defined inside measurement probe 1. The space defined inside measurement probe 1 is closed space 45 defined by a signal processor 44, linear motor 18, and third movable portion 14 in FIGS. 5 and 6 described below. First light source 26, second light source 28, and third light source 30 are respectively disposed to emit laser beams 27, 29, and 31 in parallel with the Z direction. With such a light source disposition, the atmospheric temperature and the atmospheric pressure near each of laser beams 27, 29, and 31 are maintained substantially the same even though measurement probe 1 moves in the Z direction. Therefore, it is possible to control the measurement force by stylus 20 with high accuracy and high stability even in a case where the control is performed by a minute difference between the laser length measurement values of respective light sources 26, 28, and 30.

As described above, first position measurer 15, second position measurer 16, and third position measurer 17 may be disposed such that first light source 26, second light source 28, and third light source 30 are disposed at positions close to each other and optical axes of laser beams 27, 29, and 31 from respective light sources 26, 28, and 30 are parallel.

Figure 5:
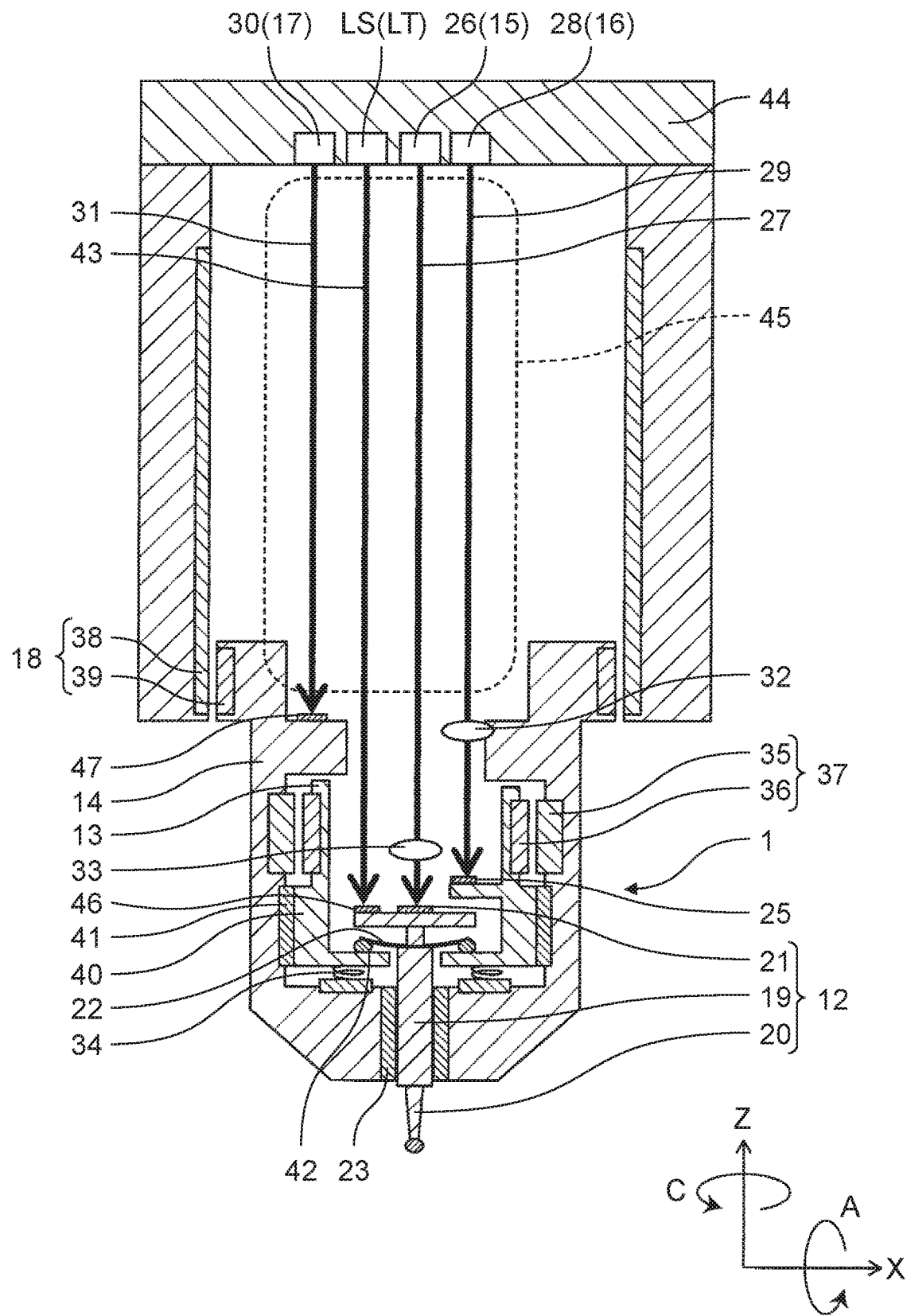
FIG. 5 is a diagram when the measurement probe moves down in a Z direction.
Figure 6:
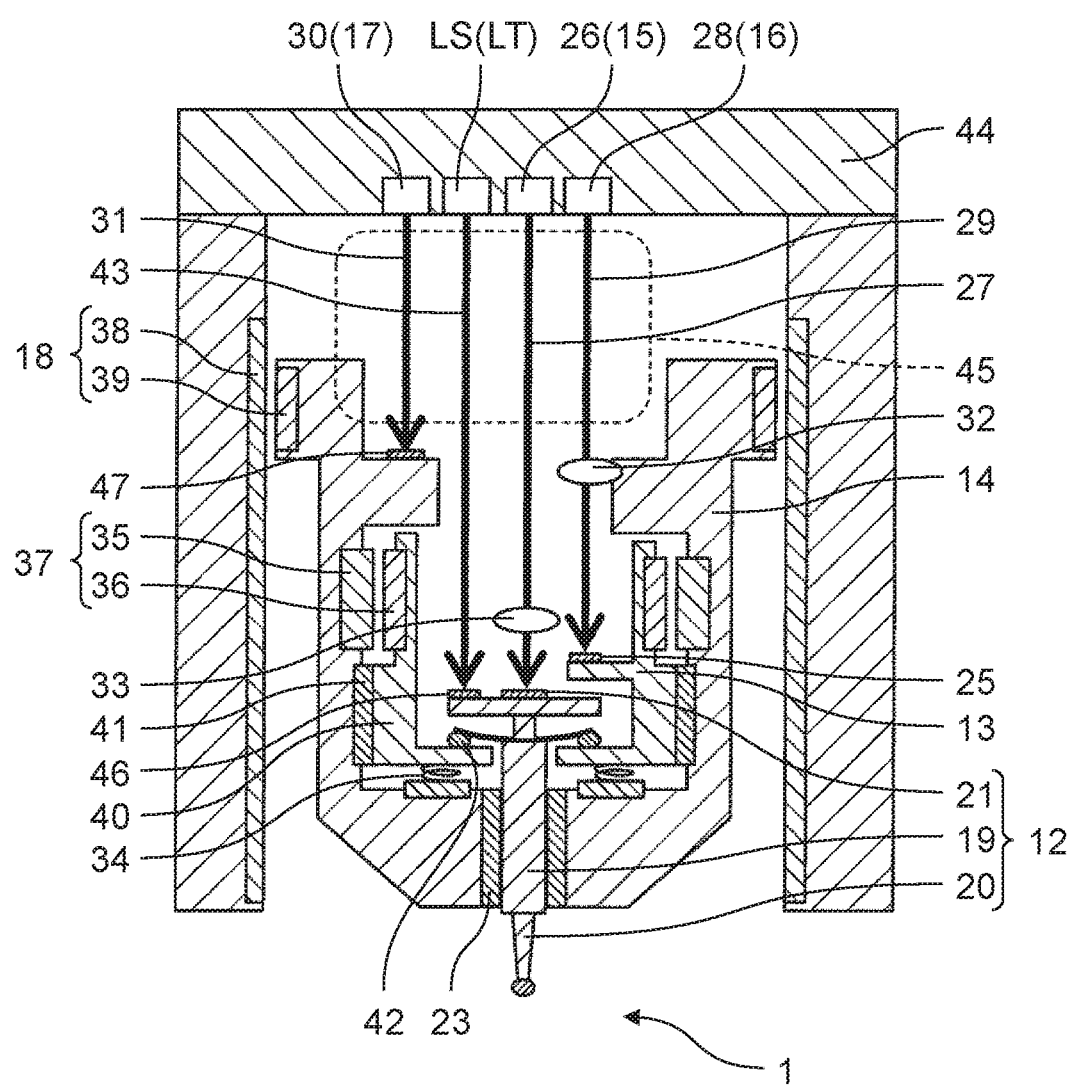
FIG. 6 is a diagram when the measurement probe in FIG. 4 moves up in the Z direction.

FIG. 5 is a diagram when measurement probe 1 moves down in the Z direction. FIG. 6 is a diagram when measurement probe 1 moves up in the Z direction. As shown in FIG. 5, first light source 26 is provided on an extension line of a center position of air slider 19 in the Z direction to measure a measurement position of measurement object 9 in the Z direction. Laser beam 27 from first light source 26 passes through lens 33 fixed to third movable portion 14 and reaches first mirror 21.

Second light source 28 is provided such that a center of laser beam 29 is located in an X+ direction with respect to the optical axis of laser beam 27 from first light source 26 to measure a position of second movable portion 13 in the Z direction. Laser beam 29 from second light source 28 passes through lens 32 and reaches second mirror 25.

Third light source 30 is provided such that a center of laser beam 31 is located in an X− direction with respect to the optical axis of laser beam 27 from first light source 26 to measure a position of third movable portion 14 in the Z direction.

When the optical paths of laser beams 27, 29, and 31 from respective light sources 26, 28, and 30 are provided in space 45 between signal processor 44 and measurement probe 1 as described above, conditions such as atmospheric temperature and atmospheric pressure near respective laser beams 27, 29, and 31 are the same. Therefore, the laser length measurement values of respective laser beams 27, 29, and 31 have the same change in the fluctuation of the position measurement in the Z direction due to the disturbance. A value of Z2-Z4 in the equation of Formula 1 for detecting the measurement force applied to measurement object 9 is not affected by the fluctuation.

As described above, in the present exemplary embodiment, the conditions such as atmospheric temperature and atmospheric pressure for the laser length measurement of laser beams 27, 29, and 31 from respective light sources 26, 28, and 30 are substantially the same in space 45. As a result, it is possible to measure the position of first spring 22 supporting stylus 20 at high speed and with high accuracy.

To avoid a drift due to a time change of the fluctuation of the position measurement, a state is set in which a tip of stylus 20 is not in contact with measurement object 9 immediately before the measurement of measurement object 9 ends and the next measurement is started. In this state, controller 95 sets first relative position R1 and second relative position R2 to predetermined values stored in advance. At this time, controller 95 performs reset processing of resetting the laser length measurement values of respective light sources 26, 28, and 30, which are varied by local variations of the atmospheric temperature and the atmospheric pressure while maintaining the measurement force constant. That is, before the measurement of the measurement object is started, controller 95 performs the reset processing of returning the values of first relative position R1 and second relative position R2 to the predetermined values stored in advance.

As shown in FIG. 6, measurement probe 1 moves up in the Z direction with a stroke of about 30 mm to 120 mm to measure measurement object 9. As shown in FIGS. 5 and 6, space 45 for measurement probe 1 to move in the Z direction is provided between the signal processor 44 and measurement probe 1. Respective laser beams 27, 29, and 31 are emitted toward the same space 45, and the atmospheric temperature, atmospheric pressure, and the like are substantially the same in space 45. Therefore, it is possible to minimize the influence of an air fluctuation in laser beams 27, 29, and 31 and control the measurement force constant even though measurement probe 1 moves in the Z direction.

Second movable portion 13 is moved at high speed in the Z direction such that the measurement force MF calculated by the equation of Formula 1 becomes constant. At this time, the feedback is performed to coil 39 of linear motor 18 in addition to second movable portion 13 to move third movable portion 14. As described above, measurement probe 1 is moved in the Z direction, and frequency-stabilized He— Ne laser 4 is emitted to Z-axis reference mirror 7 to measure the displacement of the measurement surface of measurement object 9 in the Z direction. In this state, entire measurement probe 1 is scanned in the XY direction to measure the shape of measurement object 9. In this manner, it is possible to perform more reliable shape measurement while maintaining the measurement force low.

In a case where measurement probe 1 is inclined with the scanning of measurement probe 1 in the XY direction, a multiplication of a distance and an angle from a rotation center position of stylus 20 stored in advance is obtained. In this manner, an XY position of the tip of measurement probe 1 is corrected and the corrected position is used as the measurement value even in a case where the measurement surface of measurement object 9 is inclined.

Therefore, it is possible to perform highly accurate measurement. Since the low measurement force can be maintained, it is possible to prevent stylus 20 supported by air slider 19 from falling and perform the highly accurate measurement.

Measurement Example

Figure 9:
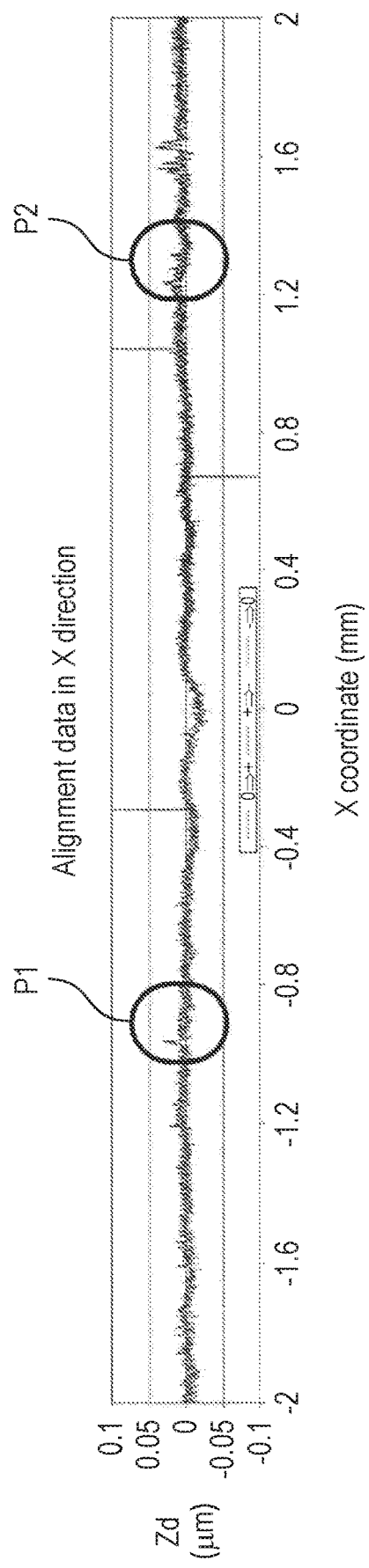
FIG. 9 is a graph in which a range of a horizontal axis of the graph in FIG. 7 is reduced.
Figure 10:
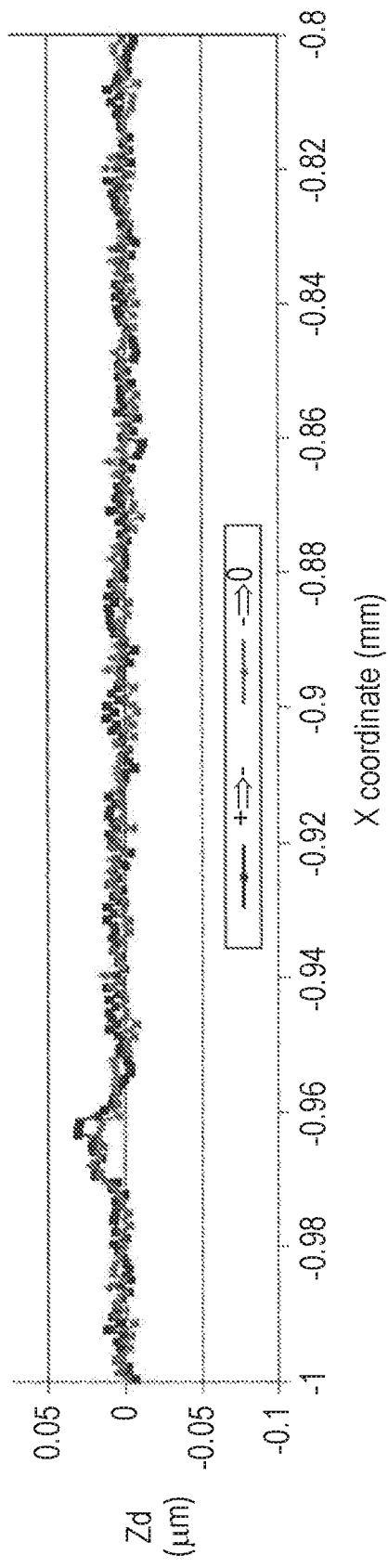
FIG. 10 is a graph in which region P1 of the graph in FIG. 9 is enlarged.
Figure 11:
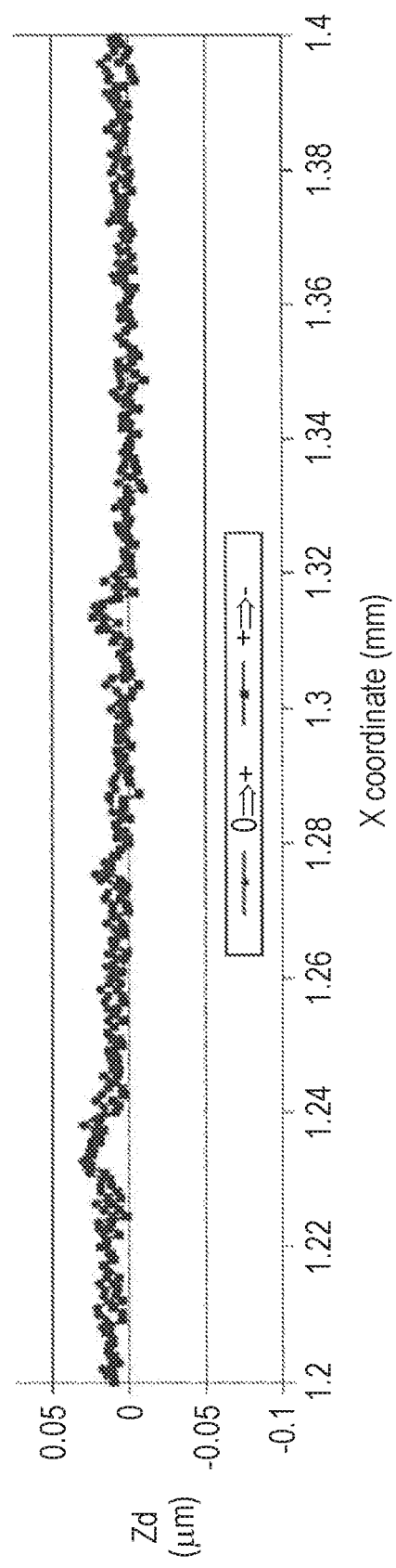
FIG. 11 is a graph in which region P2 of the graph in FIG. 9 is enlarged.
Figure 12:
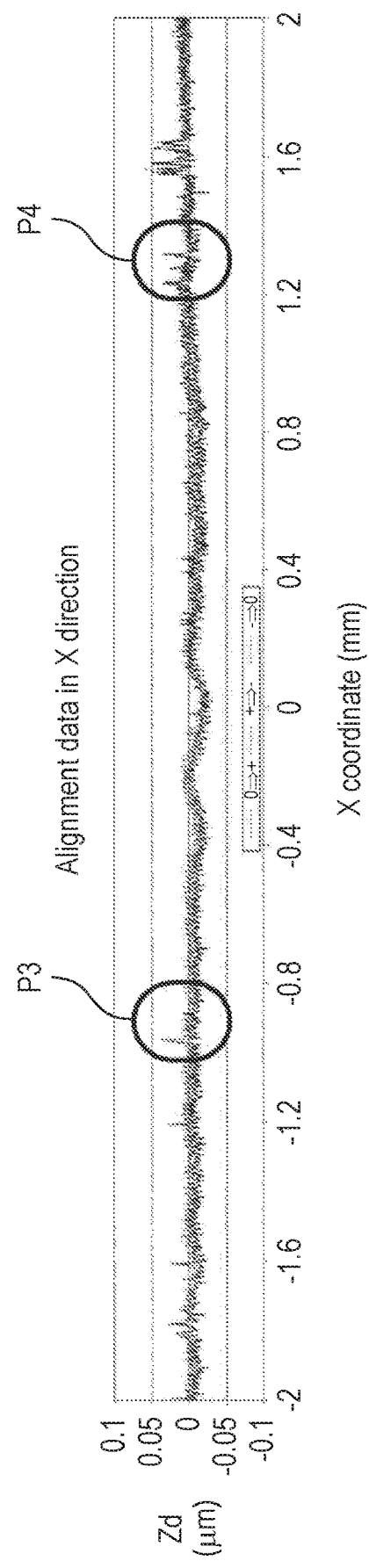
FIG. 12 is a graph in which a range of the horizontal axis of the graph in FIG. 8 is reduced.

Sample data examples measured using measurement probe 1 of the present disclosure are shown with reference to FIGS. 7 to 14. FIG. 7 is a graph showing a measurement result with measurement force of 15 mgf. FIG. 8 is a graph showing a measurement result with measurement force of 1.7 mgf. FIG. 9 is a graph in which a range of a horizontal axis of the graph in FIG. 7 is reduced. FIG. 10 is a graph in which region P1 of the graph in FIG. 9 is enlarged. FIG. 11 is a graph in which region P2 of the graph in FIG. 9 is enlarged. FIG. 12 is a graph in which a range of the horizontal axis of the graph in FIG. 8 is reduced. FIG. 13 is a graph in which region P3 of the graph in FIG. 12 is enlarged. FIG. 14 is a graph in which region P4 of the graph in FIG. 12 is enlarged. In FIGS. 7 to 14, a vertical axis Zd indicates a difference between a design shape and the Z direction, and the horizontal axis indicates an X coordinate. An R5.55 mm sphere is used as the measurement object, and measurement is performed up to 60° in the X direction. Measurement conditions are a speed of 1 mm/s and a pitch of 0.001 mm.

As shown in FIGS. 7 and 8, it can be seen that an inclination of stylus 20 due to the measurement force becomes small by reducing the measurement force from 15 mgf to 1.7 mfg, and a curvature of the lens is measured with a correct value.

As shown in FIGS. 9 to 14, it can be seen that dimple-like unevenness remaining on the measurement surface of measurement object 9 can be measured in a shape conforming to an actual shape by reducing the measurement force from 15 mfg to 1.7 mgf. When FIGS. 10 and 11 in which regions P1 and P2 in FIG. 9 are enlarged are compared with FIGS. 13 and 14 in which regions P3 and P4 in FIG. 12 are enlarged, convex shapes 80 in FIGS. 13 and 14 are measured as larger shapes than in FIGS. 10 and 11. That is, it is possible to perform the measurement conforming to the actual shape as the measurement force is lower.

Effect

With measurement probe 1 of the present disclosure, first movable portion 12, second movable portion 13, third movable portion 14, first position measurer 15, second position measurer 16, third position measurer 17, first driver 37, and second driver 18 are provided, and the reduction of the measurement force of the probe and high-speed response of the probe are possible.

First movable portion 12 and second movable portion 13 are connected by first spring 22, and thus high-speed response of measurement probe 1 is possible while maintaining the measurement force at a low value.

Since first position measurer 15, second position measurer 16, and third position measurer 17 are provided in parallel, optical axis adjustment at a time of assembly is easy. Since it is possible to make the influence of the air fluctuation in laser beams 27, 29, and 31 the same, it is possible to perform the measurement with low measurement force and high accuracy without affecting control of the measurement force.

It is possible to perform the measurement with high accuracy of a nanometer order and while suppressing the influence of disturbance due to the air fluctuation even in a case where measurement object 9 has, for example, a highly inclined surface of 75°.

According to the present disclosure, it is possible to provide the measurement probe in which the reduction of the measurement force and the high-speed response are possible.

In the measurement probe of the present disclosure, the lightweight cup-shaped second movable portion that moves in the Z direction supports the first spring that supports the stylus. It is possible to perform the measurement at high speed in the Z direction with constant measurement force according to the measured uneven shape of the surface. The second movable portion that moves at high speed does not require posture accuracy other than in the Z direction. Since the light sources for the position measurement in the Z direction are installed at the same site, assembly adjustment is easy. The optical axis of the beam from the light source is located in the same space. Therefore, it is possible to perform the measurement at high speed and with low measurement force without being affected by the air fluctuation of the laser length measurement.

What is claimed is:

1. A measurement probe that scans a surface of a measurement object to measure a shape of the surface of the measurement object, comprising:
   a first movable portion having a stylus;
   a second movable portion that is connected to the first movable portion and is movable in a Z direction;
   a third movable portion that is internally provided with a space for accommodating the second movable portion, is connected to the second movable portion, and is movable in the Z direction;
   a first position measurer that measures a first position of the first movable portion in the Z direction;
   a second position measurer that measures a second position of the second movable portion in the Z direction; and
   a third position measurer that measures a third position of the third movable portion in the Z direction,
   wherein a first relative position is calculated based on the first position and the second position,
   a second relative position is calculated based on the first position and the third position, and
   (i) the first relative position of the second movable portion with respect to the first movable portion in the Z direction and (ii) the second relative position of the third movable portion with respect to the first movable portion in the Z direction are maintained constant.

2. The measurement probe of claim 1, further comprising:
   a first spring that connects the first movable portion with the second movable portion; and
   a second spring that connects the second movable portion with the third movable portion.

3. The measurement probe of claim 1,
   wherein mass of the second movable portion is ¹⁄₁₀₀ or less of mass of the third movable portion.

4. The measurement probe of claim 1,
   wherein the first position measurer, the second position measurer, and the third position measurer are provided in a space defined inside the measurement probe.

5. The measurement probe of claim 4,
   wherein the first position measurer includes a first light source,
   the second position measurer includes a second light source,
   the third position measurer includes a third light source, and
   each of the first light source, the second light source, and the third light source is disposed to emit beams in parallel to the Z direction.

6. The measurement probe of claim 1,
   wherein the measurement probe resets the first relative position and the second relative position to predetermined positions stored in advance.

7. A shape measuring device comprising:
   the measurement probe of claim 1.

* * * * *